(12) United States Patent
Hatamura

(10) Patent No.: US 7,753,037 B2
(45) Date of Patent: Jul. 13, 2010

(54) ENGINE

(76) Inventor: Koichi Hatamura, 20-16, Danbarayamazaki-cho, Minami-ku, Hiroshima-shi, Hiroshima, 732-0813 (JP)

( * ) Notice: Subject to any disclaimer, the term of this patent is extended or adjusted under 35 U.S.C. 154(b) by 433 days.

(21) Appl. No.: 11/665,175

(22) PCT Filed: Oct. 17, 2005

(86) PCT No.: PCT/JP2005/019026

§ 371 (c)(1),
(2), (4) Date: Oct. 4, 2007

(87) PCT Pub. No.: WO2006/043502

PCT Pub. Date: Apr. 27, 2006

(65) Prior Publication Data

US 2008/0127952 A1    Jun. 5, 2008

(30) Foreign Application Priority Data

Oct. 20, 2004  (JP) ............................. 2004-305224
Apr. 20, 2005  (JP) ............................. 2005-122228

(51) Int. Cl.
*F02B 47/08* (2006.01)
*F02B 47/10* (2006.01)

(52) U.S. Cl. ................................ 123/568.13; 123/58.8
(58) Field of Classification Search ............ 123/568.13, 123/568.14, 58.8, 316; 60/605.1, 605.2
See application file for complete search history.

(56) References Cited

U.S. PATENT DOCUMENTS

| 3,906,907 A | * | 9/1975 | Canale ..................... 123/217 |
| 6,178,933 B1 | | 1/2001 | Lavy |
| 6,308,666 B1 | | 10/2001 | Drecq |
| 2004/0123820 A1 | | 7/2004 | Hasegawa et al. |

FOREIGN PATENT DOCUMENTS

| DE | 3903474 A | 9/1989 |
| FR | 2078819 A | 11/1971 |
| JP | 49-39696 Y | 10/1974 |
| JP | 51-34526 B | 9/1976 |
| JP | 55-081253 A | 6/1980 |
| JP | 3-33410 A | 2/1991 |
| JP | 5-086992 A | 4/1993 |
| JP | 5-187326 A | 7/1993 |
| JP | 2001-20766 A | 1/2001 |
| JP | 2003-74416 A | 3/2003 |

OTHER PUBLICATIONS

Kijima, K. et al. "Combined EGR System", A Development of New Technology for NOx Reduction, 2004, pp. 15-18, No. SAE20045094, Society of Automotive Engineers of Japan.

* cited by examiner

*Primary Examiner*—Mahmoud Gimie
(74) *Attorney, Agent, or Firm*—Smith Patent Office

(57) ABSTRACT

The present invention provides an engine capable of increasing an introducing amount of an EGR gas without reducing an introducing amount of a fresh air. In an engine structured to introduce fresh air and an EGR gas into a cylinder, the EGR gas is introduced into the cylinder at least at a part of a compression stroke using a pressure in a combustion chamber at least at a part of a power stroke.

5 Claims, 12 Drawing Sheets

FIG. 4
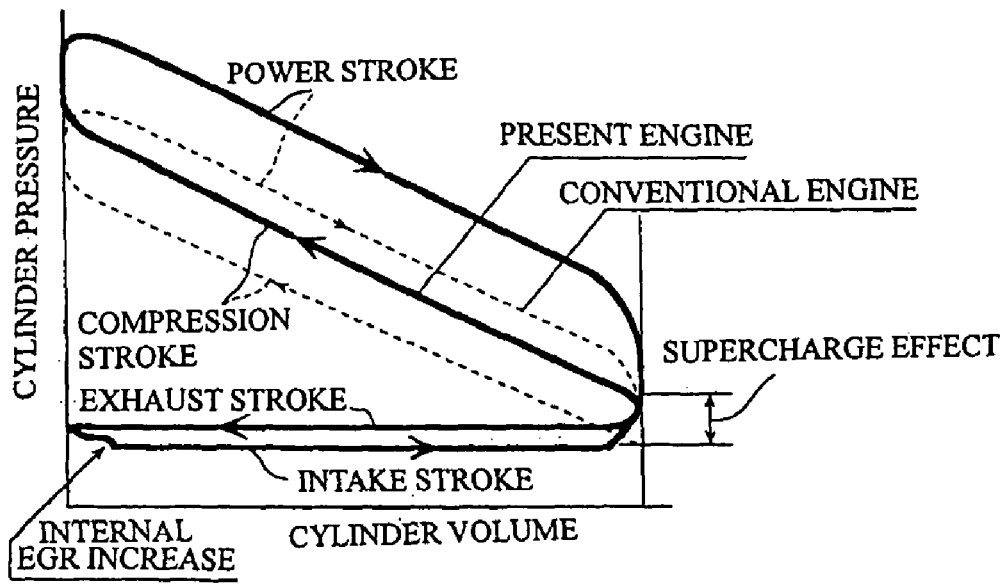
FIG. 5  IGNITION ORDER 1-3-4-2
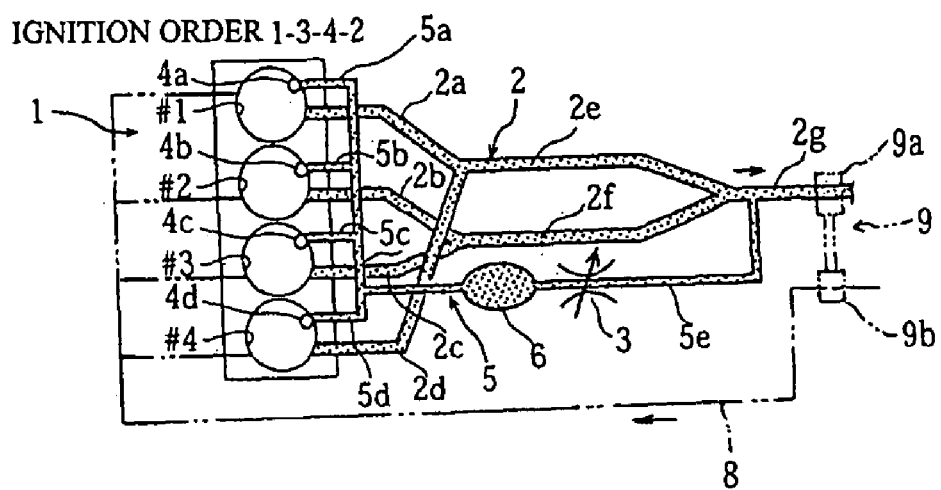
FIG. 6
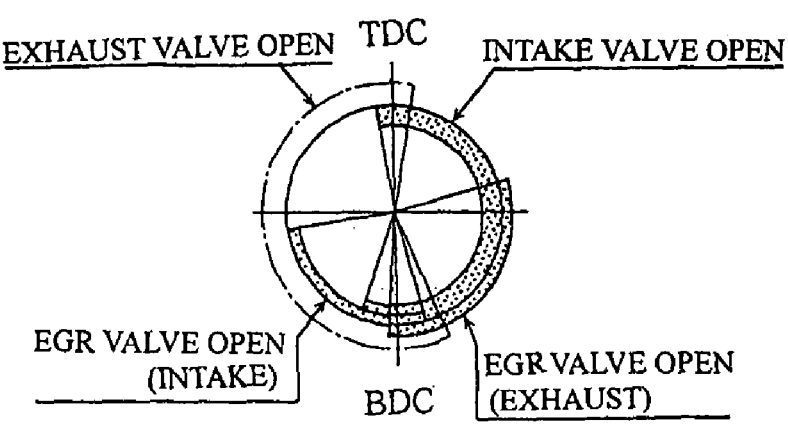

Exhaust Rebreathing

Blow Down S/C

FIG. 16
LOW-LOAD OPERATION ZONE
EXHAUST REBREATHING + BLOWDOWN PRESSURE WAVE
SUPERCHARGE HCCI MODE
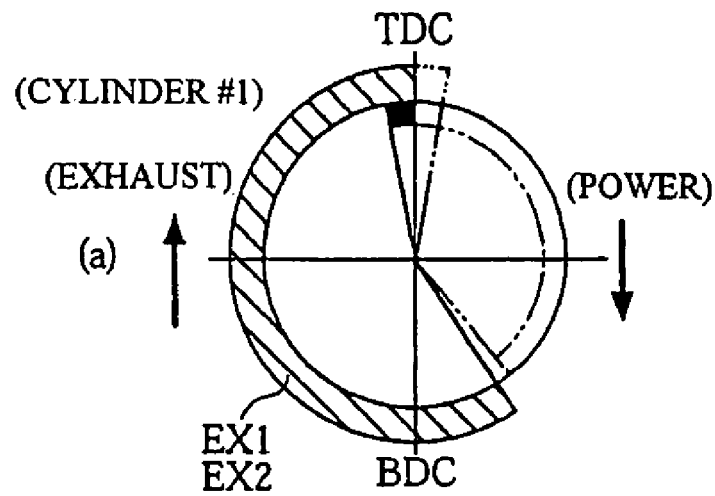
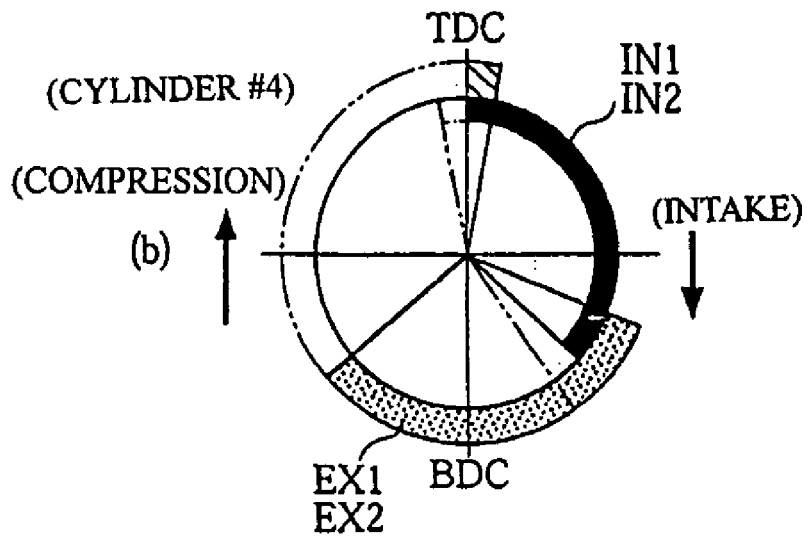

FIG. 17
MIDDLE-LOAD OPERATION ZONE
FULL-BLOWDOWN PRESSURE WAVE SUPERCHARGE
HCCI MODE
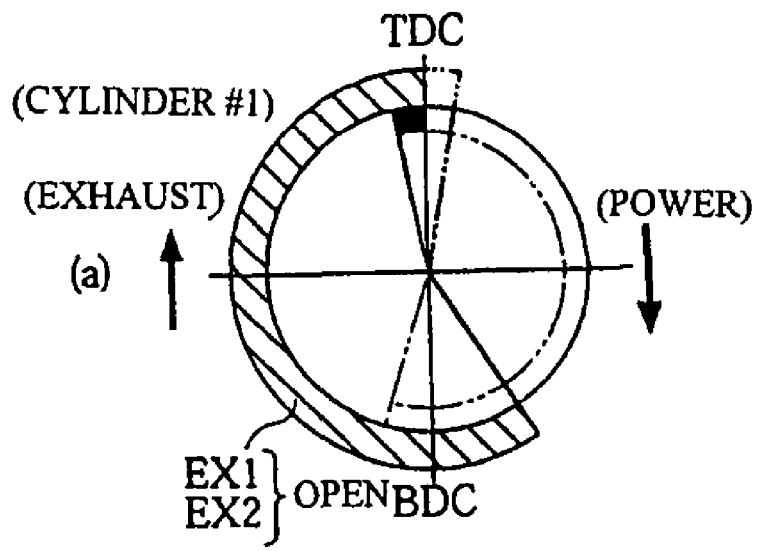
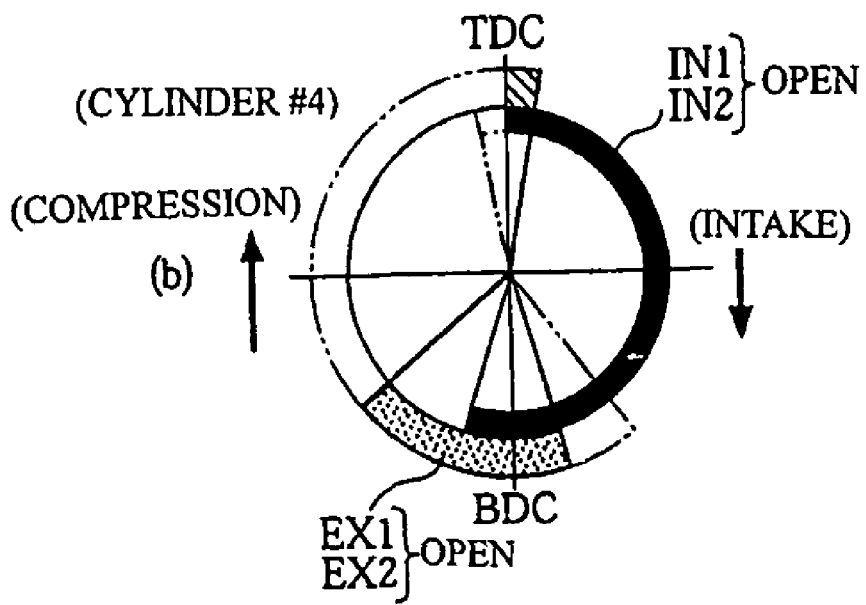

ENGINE

TECHNICAL FIELD

The present invention relates an engine structured to introduce a fresh air and an EGR gas into a cylinder and, more particularly to, an improvement on an EGR-gas introduction method allowing the introduction amount of the EGR gas to increase while the introduction amount of the fresh air is prevented from reducing with a simple structure. The present invention is suitable for a Homogeneous Charge Compression Ignition (HCCI) engine, and therefore, hereinafter, the description will be given by taking the HCCI engine for main instance.

BACKGROUND ART

The Homogeneous Charge Compression Ignition engine is an engine of a system in which fuel is injected into a combustion chamber earlier or the fuel and a gas are mixed in an intake port and the premixed air-fuel mixture is caused to self-ignite in the vicinity of a compression dead center backed by a combustion reaction caused by a compression temperature, while a general diesel engine feeds by injecting the fuel in the vicinity of the compression dead center.

In the Homogeneous Charge Compression Ignition engine of this type, in order to obtain required output while ensuring a low NOx emission feature, it is necessary to suppress a combustion temperature determined by the heat value of the fuel and the heat capacity of the air-fuel mixture to a below temperature generating NOx. In other words, it is necessary that G/F being a ratio of an air-fuel mixture mass (fresh air+EGR gas) to a fuel mass is kept within a lean between 25 to 30 or more. Specifically, when the air-fuel mixture mass does not increase, the fuel supply amount is limited to increase, and as a result, it is impossible to increase a load to more than a half load of conventional engines (G/F=15).

Further, when a fuel injection amount is increased under the condition of a constant air-fuel mixture mass, a loud combustion noise arises caused by a pressure increase ratio due to a rapid temperature increase. This is also the cause not allowing the load increase by constraining G/F.

As a result, in a naturally aspirated (NA) engine limited to increase the air-fuel mixture mass, the higher limit of a high-efficient and super-low NOx HCCI operation zone is limited to about a half load of the conventional engines.

From a viewpoint of increasing the EGR ratio, there is one designed to increase the EGR gas amount introduced into the cylinder by slightly opening an exhaust valve simultaneously with the opening of an intake valve, in which the exhaust valve opening is affected by exhaust gas pulse of the other cylinder, to increase the EGR gas amount introduced into the cylinder (for example, see Nonpatent document 1).

[Nonpatent document 1] SAE20045094: Society of Automotive Engineers of Japan.

DISCLOSURE OF THE INVENTION

Problems to be Solved by the Invention

In the above-described conventional art, the exhaust valve is controlled to open/close so that the time when the intake valve lift is maximized substantially coincides with the time when the exhaust valve lift to introduce the EGR is maximized. Therefore, the EGR gas is introduced into the cylinder in the course of the intake stroke. The EGR gas then pushes the fresh air back to an intake port side or blocks the fresh air from entering and thereby it is introduced into a vacant portion, so that the air-fuel mixture mass cannot be increased. Specifically, in the above-described conventional art, the EGR gas is once pushed into the cylinder by the exhaust gas pulse, however, the pressure in the cylinder goes back to an intake pipe pressure at a bottom dead center. Accordingly, the pressure in the cylinder at the start of the compression is equal to the intake pipe pressure, and a supercharge effect cannot be obtained by the exhaust gas pressure in the end in the above-described conventional art.

An object of the present invention is to provide an engine capable of increasing an introduction amount of an EGR gas without reducing an introduction amount of a fresh air.

Means for Solving the Problems

The invention is an engine structured to introduce a fresh air and an EGR gas into a cylinder, in which the EGR gas is introduced into the cylinder at least in an early stage of a compression stroke using a pressure in a combustion chamber at a part of a power stroke, and thereby the pressure in the combustion chamber in the early stage of the compression stroke of the cylinder is caused to increase to higher than a pressure of an intake port.

The invention is characterized in that, an intake valve is opened to a bottom dead center of an intake stroke to breathe an intake air, and the EGR gas is introduced into the cylinder in the early stage or in a first half of the compression stroke using the pressure in the combustion chamber in a latter half of the power stroke.

The invention is characterized in that, further includes a plurality of cylinders having mutually different combustion timings, in which a pressure wave by a blowdown gas of a first cylinder is introduced into a second cylinder at least in the early stage of the compression stroke of the second cylinder.

The invention is characterized in that, an exhaust timing of the first cylinder and an exhaust valve length from the first cylinder to the second cylinder are set in order to cause the pressure wave by the blowdown gas of the first cylinder to be introduced into an exhaust port of the second cylinder in the early stage or a first half of the compression stroke of the second cylinder, and an exhaust valve of the second cylinder is opened at least in the early stage of the compression stroke of the second cylinder.

The invention is characterized in that, the cylinder includes an intake valve and an EGR valve, an opening of the EGR valve being connected to an accumulator, and the EGR valve is opened at a part of the power stroke of the cylinder to accumulate a pressure of a blowdown gas in the accumulator, and the pressure of the blowdown gas accumulated in the accumulator is introduced into the cylinder by opening the EGR valve of the cylinder at least in the early stage of the compression stroke of the cylinder.

The invention is characterized in that, further includes a plurality of cylinders having mutually different combustion timings, in which the cylinders include an intake valve, an exhaust valve and an EGR valve, respectively, and in which the openings of the EGR valves of the respective cylinders are connected to a common accumulator.

The invention is characterized in that, the engine is a rotary engine including a rotor disposed in a rotor housing, the rotor rotating so as to go along an inner peripheral face of the rotor housing, and a communication passage is formed in a part of the rotor housing to communicate the adjacent combustion chambers in the power and compression strokes.

The invention is characterized in that, the cylinder includes an intake valve and two exhaust valves, an accumulator and an exhaust passage are connected to an opening of the first exhaust valve and an opening of the second exhaust valve, respectively, and in a middle-load operation, the first exhaust valve is opened at a part of the power stroke to accumulate a pressure of a blowdown gas of the cylinder in the accumulator; the first exhaust valve is closed in an exhaust stroke and the second exhaust valve is opened to exhaust; and the intake valve is opened in an intake stroke and the first exhaust valve is opened at least in the early stage of the compression stroke to thereby introduce the pressure of the blowdown gas accumulated in the accumulator into the cylinder.

The invention is characterized in that, in a low-load operation zone, the accumulator is opened toward a lower stream of an exhaust system while the intake valve is closed in a middle of the intake stroke, and the first exhaust valve is opened from a first half of the intake stroke to the early stage of the compression stroke, and thereby a bulk of the EGR gas is rebreathed into the cylinder and the second exhaust valve is opened in the exhaust stroke.

The invention is characterized in that, in a high-load operation zone, the accumulator is opened toward the lower stream of the exhaust system while the intake valve is opened from a vicinity of a top dead center of the intake stroke to the first half of the compression stroke, and the first and second exhaust valves are opened from the latter half of the power stroke to a vicinity of a top dead center of the exhaust stroke.

The invention is characterized in that, further includes first and second exhaust systems connected to the openings of the first and second exhaust valves, respectively, in which the accumulator is composed of the first exhaust system, in which a catalyst is disposed in the second exhaust system, and in which, in a warm-up operation, the intake valve is opened in the intake stroke, the first exhaust valve is fixed in a closed state, and the second exhaust valve is opened in the exhaust stroke.

The invention is characterized in that, further includes first and second cylinders, ignition timings thereof having a phase difference of 360 degrees in terms of a crank angle, in which the exhaust valves of the first and second cylinders are opened in an exhaust stroke and they are structured to be opened at a predetermined angle even in the early stage of the compression stroke, in which exhaust ports of the first and second cylinders are connected by an exhaust passage being set a pressure wave by the blowdown gas generated by an opening of the exhaust valve in an end stage of the power stroke of the cylinder on one side to reach to the exhaust port of the cylinder on the other side when the exhaust valve is opened in the compression stroke of the cylinder on the other side.

The invention is characterized in that, the exhaust passage is provided for each group composed of two cylinders, the ignition timing of the two cylinders having the phase difference of 360 degrees in terms of the crank angle.

The invention is characterized in that, in a low-load operation zone, the exhaust valve of the cylinder on the other side starts closing in the mid-course of the intake stroke while the exhaust valve of the cylinder on the other side is opened from a latter half of the intake stroke to an early stage of the compression stroke, and thereby a bulk of the EGR gas is rebreathed in the cylinder on the other side.

Here, for example, "breathes an intake air" includes both the cases where only the fresh air (ambient air) is breathed and where the mixture of the fresh air and the EGR gas is breathed as usual from the intake valve.

Also, in the present invention, the early stage of the respective strokes means the range of about 30 degrees from the top dead center or the bottom dead center to a delay direction, and the first-half thereof means the range of about 90 degrees from the top dead center or the bottom dead center to the delay direction. Similarly, the end stage of the respective strokes means the range of about 30 degrees from the top dead center or the bottom dead center to an advance direction, and the latter-half thereof means the range of about 90 degrees from the top dead center or the bottom dead center to the advance direction.

Further, the present invention is applicable to a diesel engine performing a HCCI operation, a turbo supercharge engine, a fixed-type HCCI gas engine, a ship HCCI gas engine, and further, a general diesel engine, a lean burn gas engine, and a stratified charge combustion direct fuel-injection engine, which are demanded to reduce the NOx emission, and so forth, in addition to the gasoline HCCI engine.

EFFECT OF THE INVENTION

According to the invention, it is structured that the EGR gas is introduced into the cylinder at the part of the power stroke, for example, from the end stage of the power stroke to the early stage of the exhaust stroke, preferably, using the pressure in the combustion chamber just before the exhaust valve is opened, and at least, in the early stage of the compression stroke, so that the EGR gas is introduced into the cylinder using the pressure in the high-pressure combustion chamber to thereby cause the pressure in the combustion chamber at the start of the compression stroke to increase to higher than the intake port pressure. Specifically, the supercharge effect can be obtained. Further, the compression pressure is increased together, in which the compression temperature required for the HCCI combustion downs, so that the required EGR gas amount is reduced as compared with the engine without supercharge effect.

According to the invention, it is structured that the intake air is breathed by opening the intake valve to the bottom dead center of the intake stroke and, at the same time, that the EGR gas is introduced into the cylinder using the pressure of the combustion chamber in the part of the power stroke, accordingly the intake air is introduced from the intake valve as usual and thereby the introduction amount of the EGR gas can be increased without reducing the amount of the intake air and the pressure in the combustion chamber can be increased to higher than that of the intake port, so that the supercharge effect can be obtained. Note that there is a case where an external chilled EGR gas is introduced to slow down a burning velocity, and in that case, after the mixture of the fresh air and the external EGR gas is introduced from the intake valve as usual, the same effect can be obtained, of course.

Here, in the present invention, the EGR gas is introduced in the early stage or the first-half of the compression stroke, however, the introduction of the EGR gas may start in the end stage of the intake stroke. When doing so, even when taking time to fully open the valve for introducing the EGR gas, the EGR gas amount can be ensured. The operation zone introducing the EGR gas has a relatively low load, hence, even when the intake air amount is slightly reduced by starting introducing the EGR gas in the intake stroke, that causes no trouble.

According to the invention, it is structured that the pressure wave by the blowdown gas of the first cylinder is introduced into the second cylinder in the early stage of the compression stroke of the second cylinder, and thereby the bulk of EGR gas can be introduced into the second cylinder using the pressure wave of the first cylinder, so that the above-described supercharge effect can be realized with a simple structure.

More specifically, the pressure wave by the blowdown gas by the pressure of the combustion chamber in the end stage of the power stroke of the first cylinder, preferably, just before the exhaust valve thereof is opened is introduced into the second cylinder at least in the early stage of the compression stroke of the second cylinder, preferably, just after the intake valve thereof is closed. In this case, the fresh air is introduced from the intake valve as usual, in which therefore almost the same fresh air mass as of the conventional engine is introduced, so that the EGR gas is introduced into the cylinder by the pressure wave of the high-pressure blowdown gas after the intake valve closes. Accordingly, the fresh air is not pushed out by the EGR gas, and thereby the air-fuel mixture mass increases to the extent thereof, so that the pressure in the combustion chamber at the start of the compression is increased to higher than the intake port pressure. Further, in the case of the HCCI engine, with the high-temperature blowdown gas, the high compression temperature needed for the HCCI combustion can be ensured easily and surely.

According to the invention, the exhaust timing of the first cylinder and the length of the exhaust pipe from the first cylinder to the second cylinder are set so that the pressure wave by the blowdown gas of the first cylinder is introduced into the exhaust port of the second cylinder in the early stage or in the first half of the compression stroke of the second cylinder, preferably, just after the intake valve thereof is closed, and in addition, the exhaust valve of the second cylinder is opened at least in the early stage of the compression stroke of the second cylinder, so that the air-fuel mixture mass of the second cylinder can be increased using the pressure wave by the blowdown gas of the first cylinder.

According to the invention, the EGR valve is added and the opening of the EGR valve is connected to the accumulator, so that the pressure of the blowdown gas is accumulated in the accumulator, and the EGR valve of the second cylinder is structured to open at least in the early stage of the compression stroke, preferably, just after the intake valve is closed, so that the pressure of the blowdown gas accumulated in the accumulator is introduced into the second cylinder. As a result, the air-fuel mixture mass can be increased easily and surely.

According to the invention, the communication passage communicating the adjacent combustion chambers in the power stroke and the compression stroke, respectively, is formed in the part of the rotor housing, and thereby the pressure of the blowdown gas can be introduced from the cylinder of the power stroke side to the cylinder of the compression stroke side with the extremely simple structure, so that the air-fuel mixture mass can be increased.

According to the invention, the opening of the first exhaust valve is connected to the accumulator and the exhaust valve is structured to open in the power stroke, so that the pressure of the blowdown gas is accumulated in the accumulator, and the second exhaust valve is structured to open at least in the early stage of the compression stroke, preferably, just after the intake valve is closed, so that the blowdown gas accumulated in the accumulator is introduced into the second cylinder. As a result, one of the conventionally-provided two exhaust valves can be used as a valve to accumulate the pressure of the blowdown gas, so that the air-fuel mixture mass can be increased easily and surely without complicating the structure.

According to the invention, in the low-load operation zone, the temperature needed for the compression ignition is increased to higher due to small fuel density, and therefore even when the necessary temperature cannot be obtained only by the EGR gas accumulated in the accumulator, the necessary bulk of EGR gas can be realized. Specifically, in the low-load operation zone, it is structured that the accumulator is opened to the downstream side of the exhaust system, the intake valve is closed earlier in a mid-course of the intake stroke, and the first exhaust valve is opened from the first-half of the intake stroke to the early stage of the compression stroke, so that the bulk of EGR gas can be rebreathed into the cylinder. As a result, one of the conventionally-provided two exhaust valves can be used as a valve to introduce the EGR gas, and thereby the bulk of EGR can be introduced without complicating the structure, so that the high temperature needed for the compression ignition can be obtained easily and surely.

According to the invention, in the high-load operation zone, the accumulator is opened to the downstream side of the exhaust system, the intake valve is opened from the vicinity of the top dead center of the intake stroke to the first-half of the compression stroke, and the first and second exhaust valves are opened from the latter-half of the power stroke to the vicinity of the top dead center of the exhaust stroke, so that the stable operation in the conventional spark ignition mode can be obtained.

According to the invention, in the warm-up operation, the first exhaust valve is fixed in the closed state and the second exhaust valve is opened in the exhaust stroke, and therefore the exhaust gas is exhausted only to the second exhaust system provided with the catalyst, so that the activation of the catalyst can accelerated and the clean-up performance of the exhaust gas can be improved. Specifically, in the warm-up operation, the temperature of the exhaust gas is low, and thereby it is operated in the same spark ignition mode as of conventional ones, in which the exhaust gas is cleaned up by the catalyst. In this case, when it is structured to flow the exhaust gas to both the first and second exhaust systems, the time to warm up the catalyst becomes longer because of their large heat capacity, and therefore it is disadvantage in view of ensuring the clean-up performance of the exhaust gas.

According to the invention, it is structured to include the first and second cylinders having a phase difference of 360 degrees, in which the pressure wave by the blowdown gas of the cylinder on one side reaches to the cylinder on the other side in the early stage of the compression stroke when the exhaust valve of the cylinder on the other side is opened, so that the EGR gas amount of the cylinder on the other side can be increased using the pressure wave by the blowdown gas of the cylinder on one side with extremely simple structure. Further, the pressure in the combustion chamber at the start of the compression stroke can be increased to higher than the intake port pressure together therewith.

According to the invention, the exhaust passage is provided for each group composed of the two cylinders of which ignition timings have a phase difference of 360 degrees in terms of crank angle, so that the reduction in the pressure wave by the blowdown gas in the blowdown pressure wave supercharging mode can be prevented and that the exhaust interference in the spark ignition mode can be prevented as well.

According to the invention, it is structured that the intake valve is closed earlier in the mid-course of the intake stroke and the exhaust valve is opened from the latter half of the intake stroke to the early stage of the compression stroke, so that the bulk of EGR gas can be rebreathed in the cylinder. As a result, the bulk of EGR can be introduced without complicating the structure and the high temperature needed for the compression ignition can be obtained easily and surely.

BRIEF DESCRIPTION OF DRAWINGS

FIG. 4 is a view showing a Pressure-Volume relation of the engine according to the first mode;

FIG. 5 is a schematic block diagram of an engine according to a second mode of the present invention;

FIG. 6 is a view showing a valve timing of the engine according to the second mode;

FIG. 16 is view showing valve timings in "exhaust rebreathing+blowdown pressure wave supercharging"/HCCI mode in the low-load operation zone of the engine according to the fifth mode;

FIG. 17 is view showing valve timings in a "full blowdown pressure wave supercharging"/HCCI mode in the middle-load operation zone of the engine according to the fifth mode.

Figure 1:
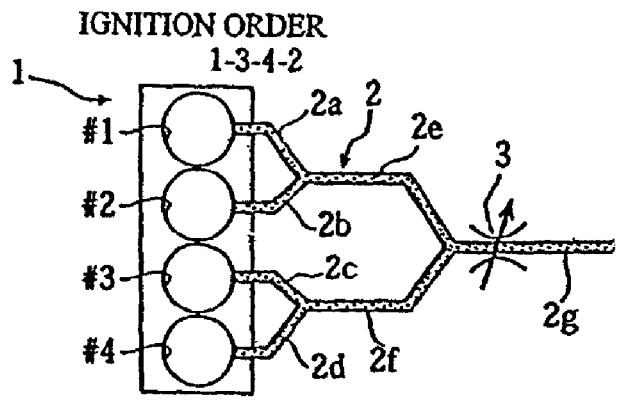
FIG. 1 is a schematic block diagram of an engine according to a first mode of the present invention.

EXPLANATION OF NUMERALS AND SYMBOLS 1 engine 1
2a to 2d exhaust branch pipe (exhaust passage)
4a to 4d EGR valve
6 EGR container (accumulator)
10 rotary engine
11 rotor housing
11a internal peripheral face
12 rotor
14 communication passage
1 first cylinder
4 second cylinder IN1, 2 intake valve
EX1 first exhaust valve
EX2 second exhaust valve

BEST MODE FOR CARRYING OUT THE INVENTION

Hereinafter, modes according to the present invention will be described based on the attached drawings.

Figure 2:
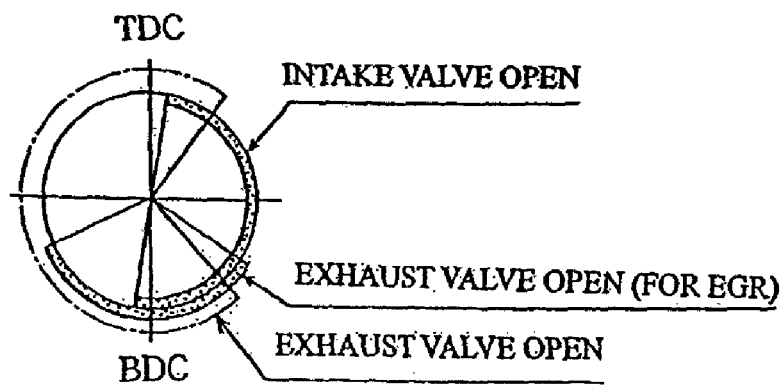
FIG. 2 is a view showing a valve timing of the engine according to the first mode.

FIGS. 1 to 4 are views to illustrate an engine supercharging a blowdown pressure wave according to a first mode of the present invention, in which FIG. 1 is an overall block diagram, FIG. 2 is a valve timing diagram, FIG. 2 is a characteristic view showing a valve timing, a blowdown gas pressure and a pressure in a cylinder, and FIG. 4 is a view showing a pressure-volume relation.

In the drawings, "1" denotes a four-cylinder HCCI engine including a first cylinder #1 to a fourth cylinder #4 to be ignited in the order of the cylinders #1-#3-#4-#2. Accordingly, in view of the ignition timing, the first cylinder #1 and the fourth cylinder #4, and the second cylinder #2 and the third cylinder #3 have a phase difference of 360 degrees in terms of a crank angle, respectively.

"2" denotes an exhaust device including first to fourth exhaust branch pipes 2a to 2d connected respectively to the first to fourth cylinders, merging pipes 2e, 2f, and a main pipe 2g. Further, an exhaust throttle valve 3 controlling an exhaust passage area in a variable manner is provided in an intervening manner into the main pipe 2g.

Here, the engine 1 is structured that the exhaust timing of the first cylinder and the length of the exhaust pipe from the first cylinder to the second cylinder are set so that a pressure wave by a blowdown gas of any cylinder (first cylinder) out of the four cylinders is introduced into an exhaust port of any other cylinder (second cylinder) from a latter half of an intake stroke to an early stage of an compression stroke of the second cylinder, and that an exhaust valve of the second cylinder is opened from the latter half of the intake stroke to the early stage of the compression stroke of the second cylinder.

Specifically, for instance, when a piston of the first cylinder #1 (second cylinder) comes down to the vicinity the bottom dead center of the intake stroke, the exhaust valve of the cylinder #1 is slightly opened to introduce an EGR gas into the cylinder #1. In this case, the open time of the exhaust valves of the cylinder #1 and the cylinder #4 and the length of a pressure transmission passage of the same, namely the length: the branch pipe 2a+the merging pipes 2e, 2f+the branch pipe 2d are set so that the pressure wave by the blowdown gas of the cylinder #4 (first cylinder) reaches to the exhaust port of the cylinder #1 during when the exhaust valve of the cylinder #1 is slightly opened. Note, in the case of this specific example, "first cylinder" and "second cylinder" in "What is claimed is" in the present application correspond to the above-described cylinder #4 and cylinder #1, respectively.

Figure 3:
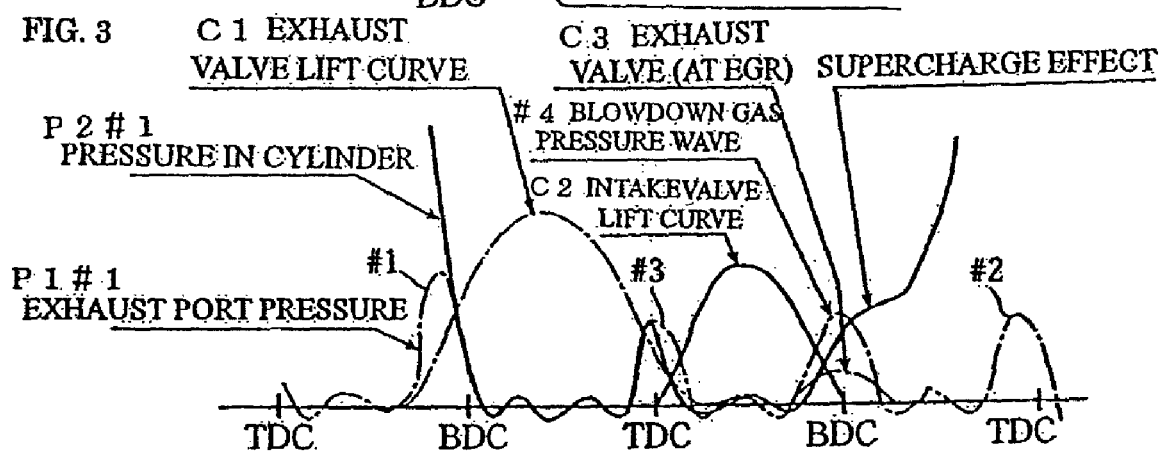
FIG. 3 is a characteristic view showing a relation between the valve timing and a blow down pressure of the engine according to the first mode.

In FIG. 3, C1, C2 denote an exhaust-valve lift curve and an intake-valve lift curve, respectively, of the cylinder #1, and C3 denotes a lift curve of the above-described exhaust valve at the time of EGR. As shown in FIG. 2 and FIG. 3, in the normal exhaust stroke, the exhaust valve is opened from the vicinity of 45 degrees before the bottom dead center to the vicinity of 30 degrees after the top dead center, and the intake valve is opened from the vicinity of 5 degrees after the top dead center to the vicinity of 5 degrees after the bottom dead center. Here, an exhaust valve close and an intake valve open are set after the top dead center in an aim to increase an EGR rate further.

At the time of EGR, the exhaust valve starts opening from the latter half of the intake stroke, in which the lift thereof is maximized in the vicinity of the intake valve close, and closes in the vicinity of 40 degrees after starting the compression stroke.

Further, in FIG. 3, "P1" denotes an exhaust gas pressure acting the exhaust port of the first cylinder #1, in which the pressure wave (exhaust pulse) by the blowdown gases from the cylinders #1, #3, #4 and #2 in accordance with the previously-described ignition order acts the exhaust port of the cylinder #1.

In the drawing, "P2" denotes a combustion chamber pressure in the cylinder #1. The combustion chamber pressure in the cylinder #1 downs sharply along with the opening of the exhaust valve and increases once in the vicinity of the end of the exhaust stroke caused by the blowdown pressure from the cylinder #3. In the vicinity of the end of the intake stroke, the above-described exhaust valve is slightly opened and the pressure wave by the blowdown gas from the cylinder #4 acts to push the EGR gas into the cylinder #1, and as a result, the pressure in the cylinder #1 increased to higher than the intake port pressure at the start of the compression stroke. Specifically, as shown in FIG. 4, it is found that the supercharge effect is obtained.

As described above, in the present mode, the pressure wave by the blowdown gas of the cylinder #4 is introduced into the cylinder #1 after the intake valve of the cylinder #1 closes. Meanwhile, in this case, the fresh air is introduced from the intake valve as usual, in which therefore almost the same fresh air mass as of the conventional engine is introduced, so that the EGR gas is introduced into the cylinder by the pressure of the high-pressure blowdown gas after the intake valve closes. Accordingly, the air-fuel mixture mass increases to the extent thereof, and the pressure in the cylinder at the start of the compression increases to the extent of the supercharge effect in FIG. 3 and FIG. 4. In addition, with the high-temperature blowdown gas, the high compression temperature needed for the HCCI combustion can be ensured easily and surely.

Note that, as for the supercharging of the EGR gas into the cylinder #3, the pressure wave by the blowdown gas of the cylinder #2 is used, and in the similar manner, as for the supercharging of the EGR gas into the cylinder #4 and the cylinder #2, the pressure wave by the blowdown gas of the cylinder #1 and the cylinder #3 is used, respectively. Specifically, according to the present invention, the pressure wave by the blowdown gas of one cylinder is used for the supercharging of the EGR gas into the other cylinder.

FIG. 5 to FIG. 8 are views to illustrate a blowdown-accumulation supercharge engine according to a second mode of the present invention. In the drawings, the same numerical references as of FIG. 1 to FIG. 4 denote the same portions or equivalent portions.

In the second mode, third valves (EGR valves) 4a to 4d are added to the cylinders #1 to #4, in addition to the normal intake valves and the exhaust valves. Branch pipes 5a to 5d of an EGR passage 5 are connected to the openings of the respective EGR valves 4a to 4d, and an EGR container (accumulator) 6 is connected to a merging pipe 5e of the branch pipes. On the downstream side of the EGR container 6, the exhaust throttle valve 3 is disposed, and the merging pipe 5e is connected to the merging pipe 2g of the exhaust device 2. Note that it is possible that the EGR passage 5 itself has such a pipe diameter and a pipe length that meet the necessary volume without providing the EGR container as described above.

Figure 7:
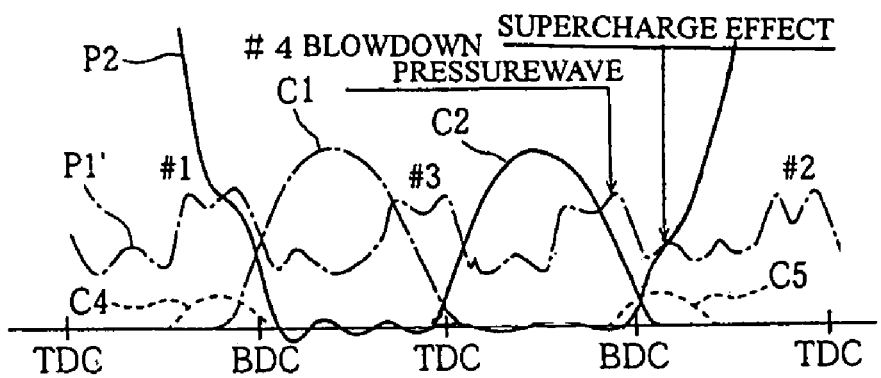
FIG. 7 is a characteristic view showing a relation between the valve timing and a blow down pressure of the engine according to the second mode.
Figure 8:
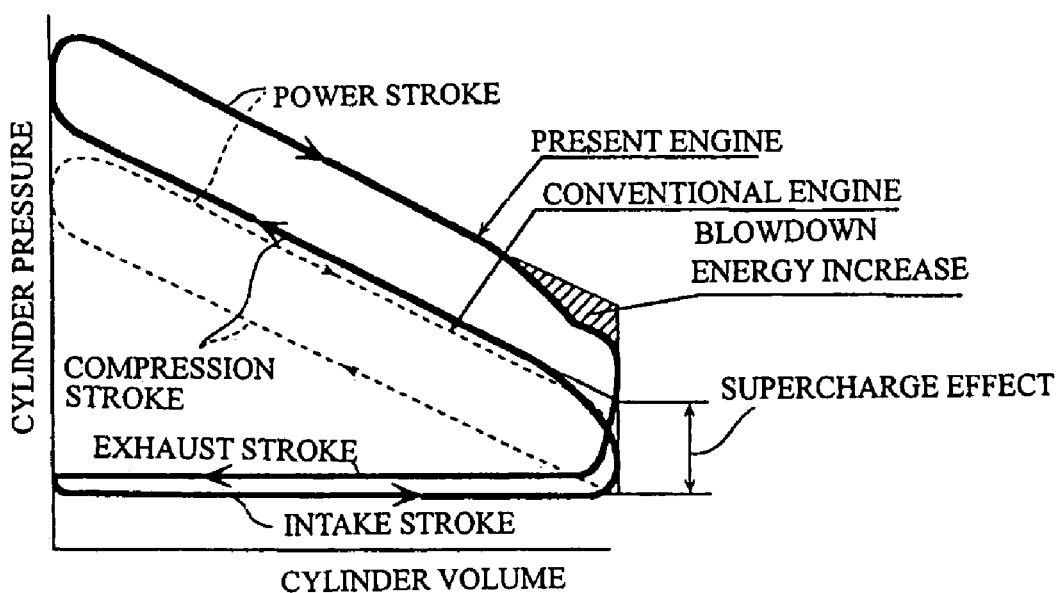
FIG. 8 is a view showing a pressure-volume relation of the engine according to the second mode.

In FIG. 7, C4, C5 denote the lift curves of the EGR valve 4a of the cylinder #1 at the time of the exhaust and intake, respectively. The EGR valves according to the present mode open from the latter half of the power stroke to the early stage of the exhaust stroke to accumulate the pressure of the blowdown gas into the EGR container 6, so that the high-pressure in the EGR container 6 from the end stage of the intake stroke to the first-half of the compression stroke is introduced into the cylinders.

Further, "P1" denotes the exhaust gas pressure in the EGR container 6, showing that the pressure wave by the blowdown gas from the cylinders #1, #3, #4, #2, in the order of ignition, acts to the EGR container 6. Note that the specific pressure in the EGR container 6 is 2 to 3 bar, as an example.

Meanwhile, "P2" denotes the pressure in the cylinder #1. The pressure in the cylinder #1 downs sharply along with the opening of the EGR valve, and when the EGR valve opens slightly in the vicinity of the end of the intake stroke, the pressure of the blowdown gas in the EGR container 6 acts, and thereby the exhaust gas is pushed into the cylinder #1, and as a result, the pressure in the cylinder #1 becomes higher at the start of the compression stroke to the extent of the supercharge effect.

Thus, in the present mode, the pressure of the blowdown gas just before the opening of the exhaust valves of the respective cylinder is accumulated into the EGR container 6, and this pressure of the blowdown gas is introduced into the respective cylinders just after the close of the intake valves of the respective cylinders. In this manner, after the fresh air mass substantially equal to that of the conventional engine is introduced, the EGR gas is introduced into the cylinder by the pressure of the high-pressure blowdown gas, and thereby the pressure in the cylinder at the start of the compression is increased to the extent of the supercharge effect in FIG. 7 and FIG. 8, so that the air-fuel mixture mass increases. In addition, with the high-temperature blowdown gas, the high compression temperature needed for the HCCI combustion can be ensured easily and surely. Moreover, by increasing the density of the EGR gas by cooling the EGR passage, the EGR ratio and the air-fuel mixture mass can be increased further.

By appropriately setting the size, open timing and opened time period of the valve, it is possible to accumulate large blowdown energy in the EGR container, so that a large EGR ratio of about 40% can be realized after the fresh air having a volumetric efficiency close to 100% is introduced. Note that, in the present mode, it is structured that the high energy in the cylinder is accumulated in the EGR container, and this causes only the pressure down in the vicinity of the dead center of the power stroke, affecting little to cycle efficiency.

Here, an ignition timing can be controlled by changing an internal EGR amount by controlling the throttle amount by the exhaust throttle valve 3. The exhaust throttle valve 3 causes very little change in the intake amount of the fresh air, so that the ignition timing can be controlled independently of the load. Furthermore, when the time to open/close and/or the lift amount of the EGR valve are/is made variable, further controllability can be obtained.

In a partial-load zone, the ignition timing can be controlled by controlling A/F by reducing the fuel supply amount and at the same time by reducing the intake amount of the fresh air by way of closing the intake valve earlier, and further, by changing the EGR ratio with the throttle valve or the variable EGR valve.

Here, in the engine shown in FIG. 5, it is possible to provide a turbocharger 9 driven by the exhaust gas. In this case, as shown by a chain double-dashed line in the drawing, a turbine 9a is disposed at the exhaust merging pipe 2g and a compressor 9b is disposed at an intake pipe 8.

Figure 9:
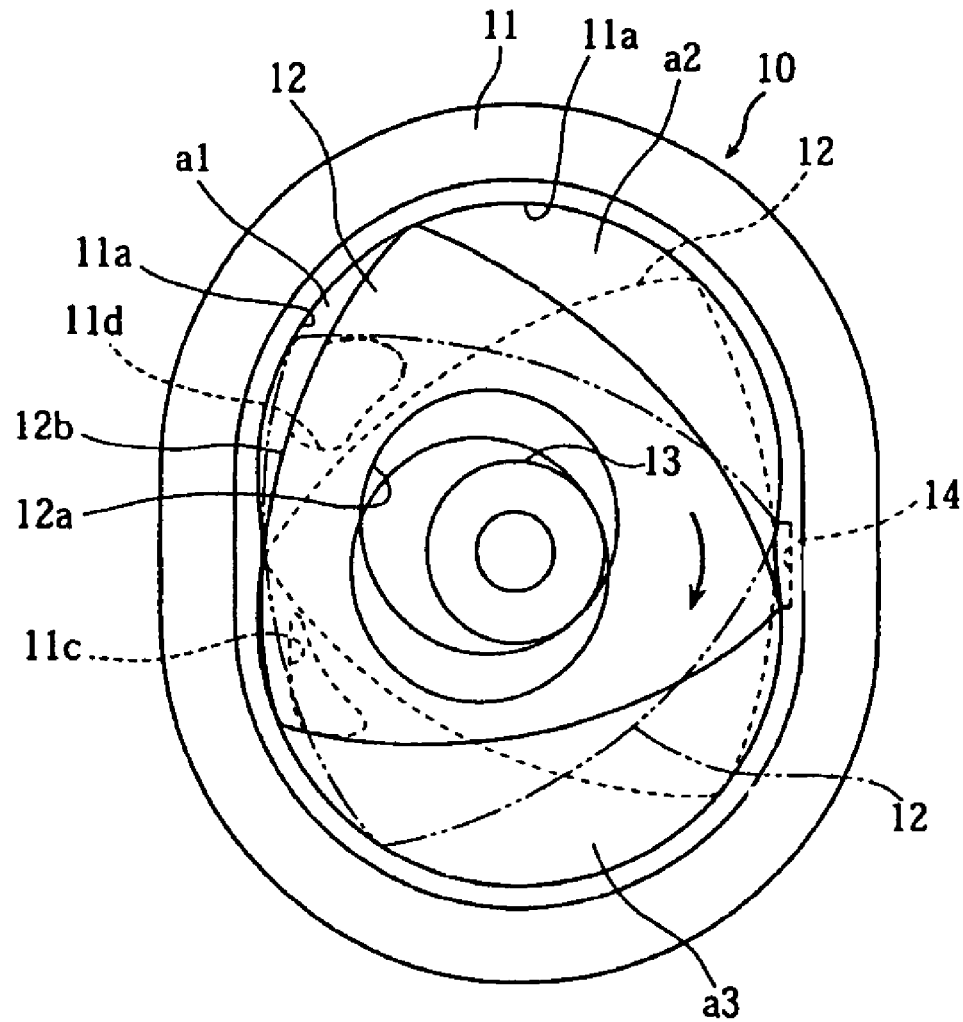
FIG. 9 is a schematic block diagram of an engine according to a third mode of the present invention.
Figure 10:
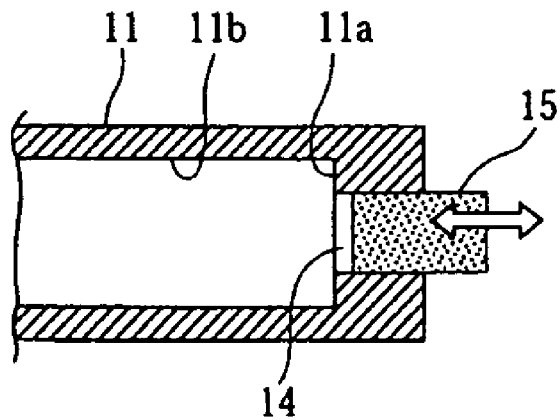
FIG. 10 is a schematic block diagram showing a modification example of the engine according to the third mode.

FIG. 9 and FIG. 10 are views to illustrate a third mode of the present invention, and are an example of the blowdown supercharging in the HCCI operation of the rotary engine.

In the drawings, "10" denotes a rotary engine having a structure in which a rotor 12 having a triangle shape is disposed in a rotor housing 11 having an egg shape in a freely rotating manner clockwise as shown in FIG. 9 and an internal gear 12a of the rotor 12 is engaged with a drive gear 13. A space surrounded by an outer peripheral face 12b of the rotor 12 and an internal peripheral face 11a of the rotor housing 11 is to form three combustion chambers a1 to a3. Further, an intake port 11d and an exhaust port 11c are formed on a side face 11b of the rotor housing 11, and both these ports close/open along with the rotation of the rotor 12.

A communication passage 14 communicating the combustion chamber in the power stroke and the combustion chamber in the compression stroke is formed in a recessed manner in the internal peripheral face 11a of the rotor housing 11 so as to open after the intake port 11d is closed and close before the exhaust port 11c is opened. More specifically, the communication passage 14 functions to communicate the adjacent combustion chambers in a time period when the rotor 12 rotates from the position indicated by a chain double-dashed line to the position indicated by a solid line in the drawing. Note that, in the time period when the rotor 12 is at the position other than the above, the communication passage 14 exists in the same chamber, having therefore no function of connecting the adjacent chambers.

In this manner, by pushing the high-pressure combustion gas into the combustion chamber in the course of the compression stroke, the internal EGR can be increased without reducing the fresh air.

In the case of the rotary engine, it is equivalent to that having three cylinders in the rotor housing, so that the blowdown supercharging can be realized with the very simple structure as described above. Note that the position and the size (area) of the communication passage 14 are selected so that the reduction in the cycle efficiency in the compression and power strokes is minimized while obtaining the necessary EGR amount.

Here, as shown in FIG. 10, a movable piston 15 is disposed in the communication passage 14 in a movable manner in a proceeding/retreating direction, and the internal EGR amount and the pressure supercharging are adjusted by moving the piston 15 in the processing/retreating direction, so that the ignition timing can be controlled.

FIG. 11 to FIG. 14 are views to illustrate a blowdown accumulation supercharge engine according to a fourth mode of the present invention, in which the same numerical references as of FIG. 5 to FIG. 10 denote the same portions or the equivalent portions.

Figure 11:
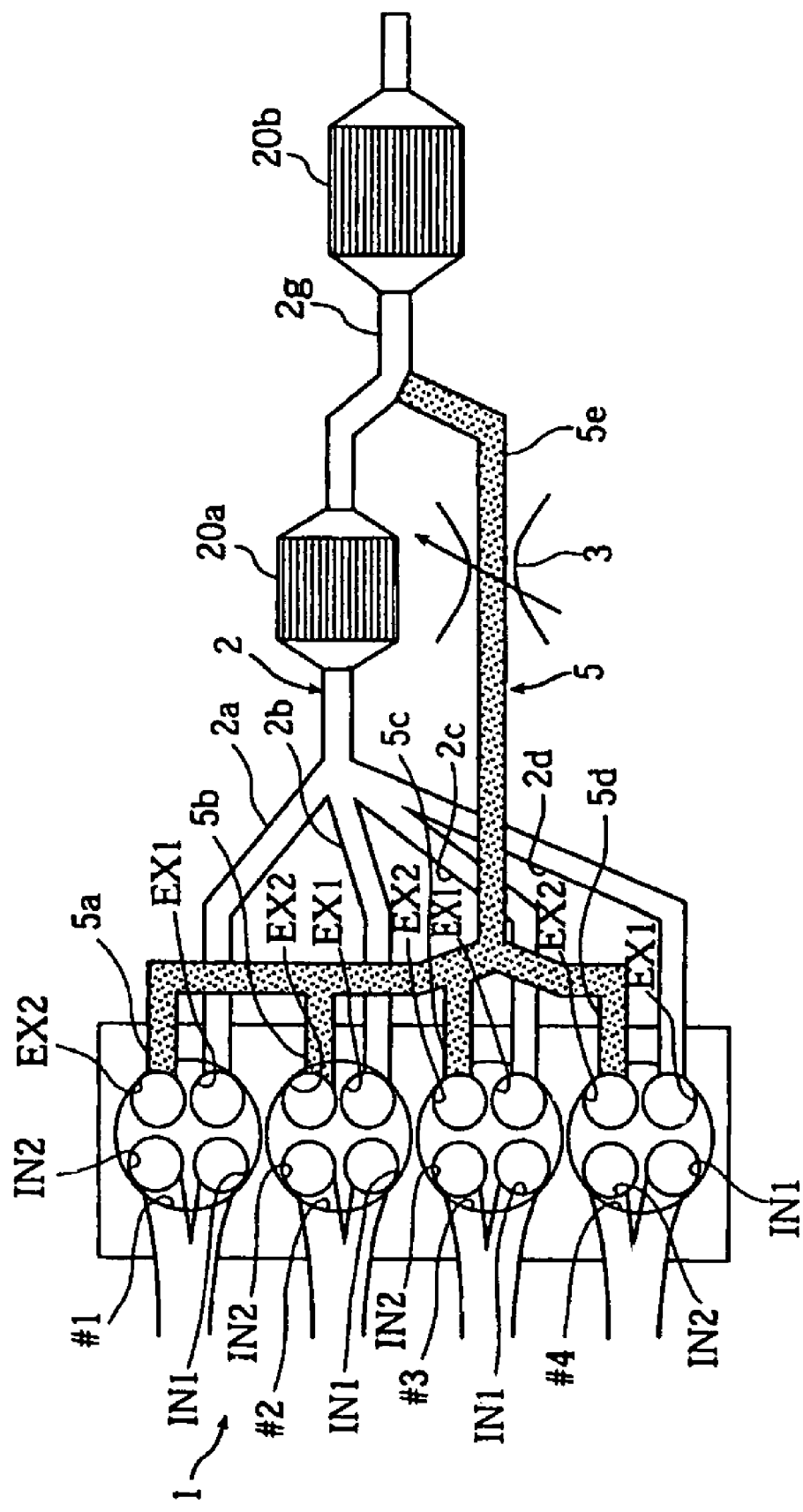
FIG. 11 is a schematic block diagram of an engine according to a fourth mode of the present invention.
Figure 12:
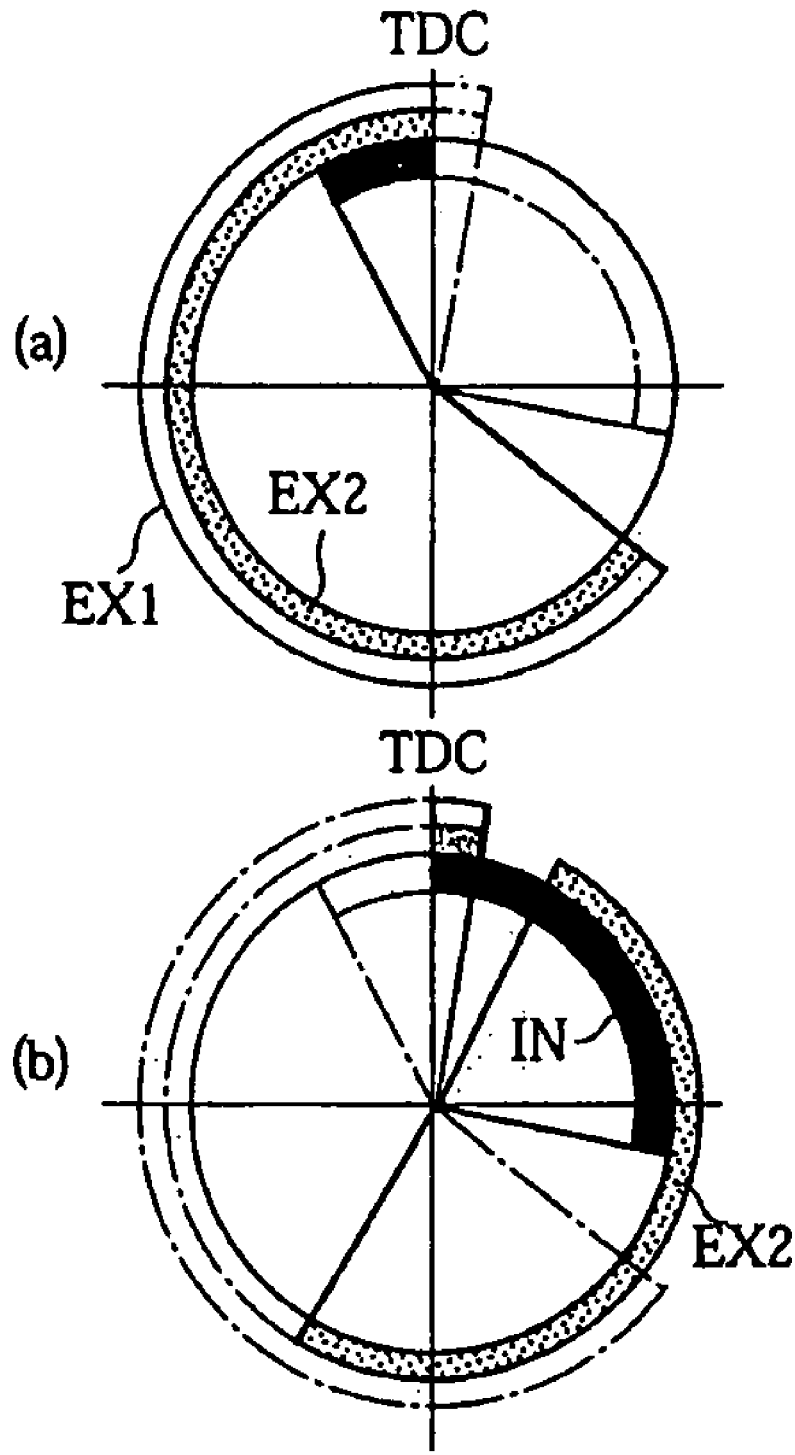
FIG. 12 is view showing valve timings in an exhaust rebreathing HCCI mode in a low-load operation zone of the engine according to the fourth mode.

FIG. 11 shows a four-cylinder blowdown accumulation supercharge system. The example engine 1 is of a four-valve HCCI engine provided with two intake valves IN1, IN2 and two exhaust valves EX1, EX2 in each cylinder. Compression ratio of the engine 1 is set to that can go together with a high-load SI mode, for example to "12".

The intake valves IN1, IN2 are both variable valve systems of a mechanical, hydraulic or electromagnetic type, in which phase and valve travel can be changed freely. The second exhaust valve EX2 out of the above-described two exhaust valves is the fully variable valve system of the hydraulic or the electromagnetic type, in which the phase and valve travel can be controlled for each cycle, while the phase and valve travel of the first exhaust valve EX1 is invariable (fixed).

Here, controlling phase and valve travel for each cycle means that combustion pressure and ion current (small current between plug gaps) are measured to detect the time of combustion and an open/close timing of the exhaust valve is feedback controlled based on the detected signal for each cylinder and for each cycle, allowing a stable HCCI combustion.

Further, an exhaust manifold is divided into two systems, namely a first exhaust system 2 connected to the first exhaust valves EX1 side and a second exhaust system 5 connected to the second exhaust valves EX2 side. The second exhaust system 5 on the EX2 side is provided with a shatter valve 3. Further, the second exhaust system 5 on the second exhaust valves EX2 side has a volume capable of retaining sufficient exhaust gas at the upstream side (engine side) from the shatter valve 3. Note that "20a" denotes a first catalyst disposed at the first exhaust system 2 and "20b" denotes a second catalyst disposed at the downstream from the merging portion of the first and second exhaust systems 2, 5.

Here, in the low-load and high-load operation zone, the shatter valve 3 is opened, and accordingly the exhaust gas pressure is not accumulated in the second exhaust system 5. Further, in the low-load operation zone, the operation is performed in an exhaust rebreathing HCCI mode (see FIG. 12) and, in the high-load operation mode, the operation is performed in an SI (spark ignition) mode (see FIG. 14).

Figure 13:
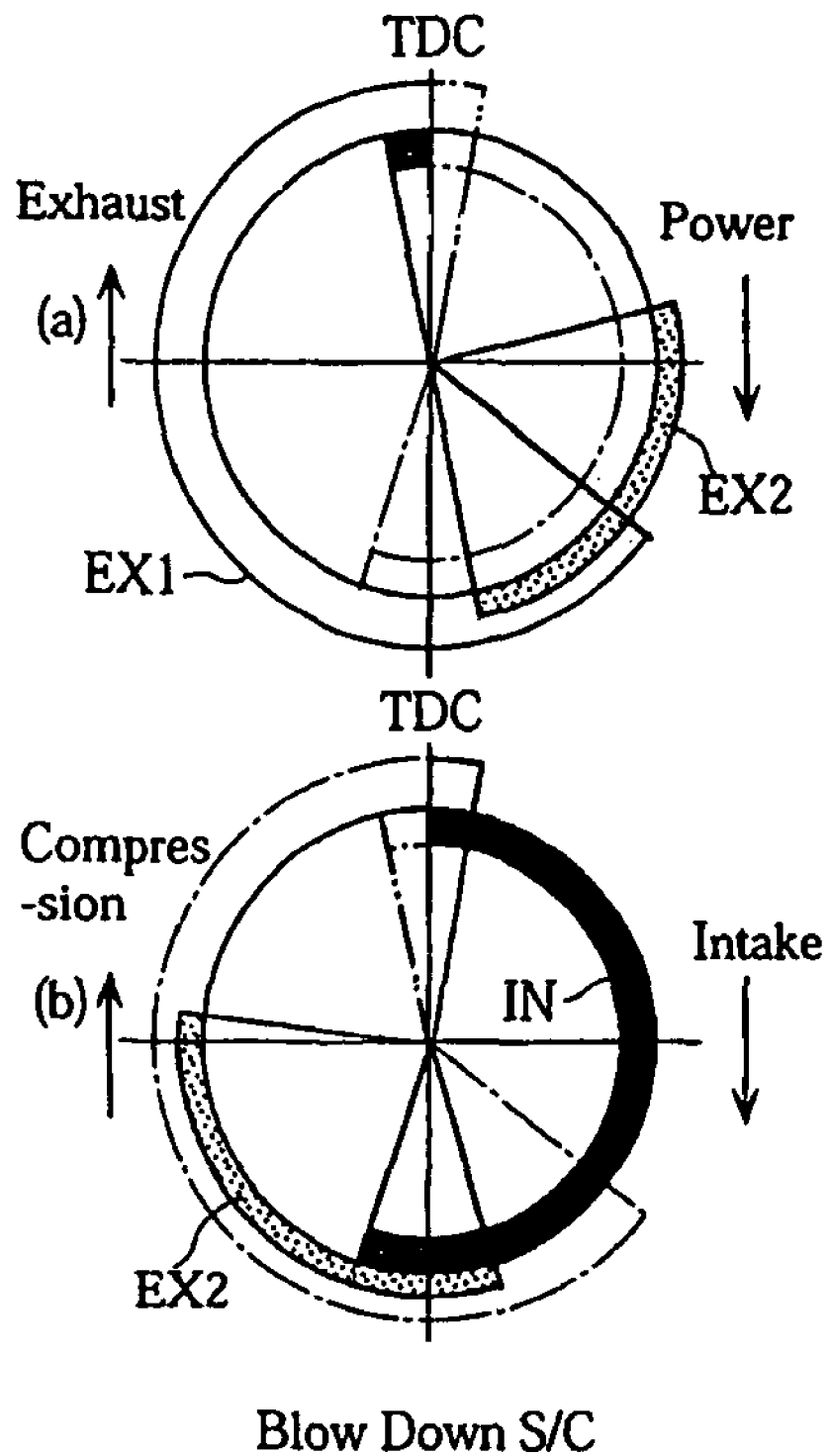
FIG. 13 is view showing valve timings in a blowdown pressure wave supercharging HCCI mode in a middle-load operation zone of the engine according to the fourth mode.
Figure 14:
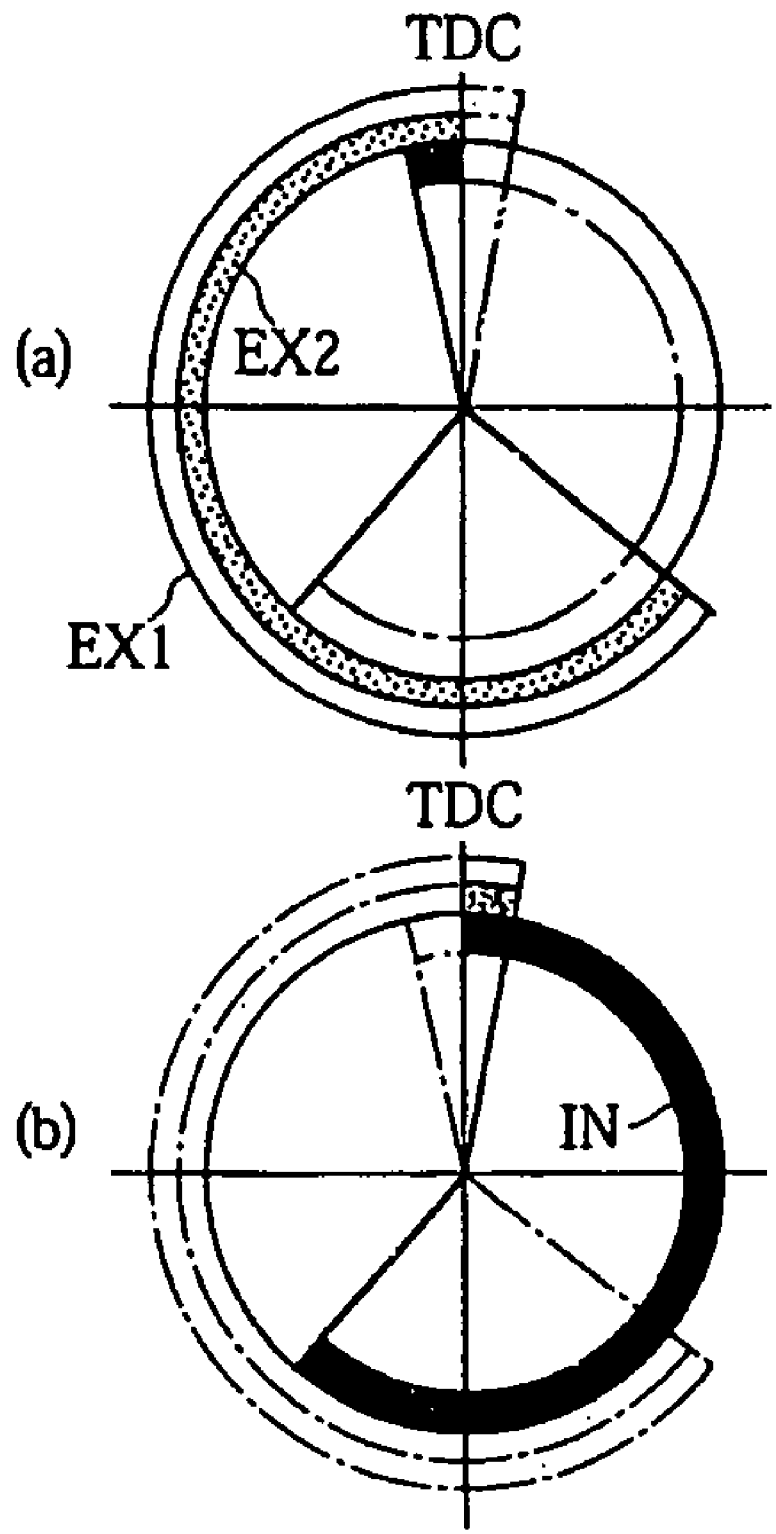
FIG. 14 is view showing valve timings in an SI mode in a high-load operation zone of the engine according to the fourth mode.

In the middle-load operation zone, the shatter valve 3 is closed and the operation is performed in a blowdown supercharging HCCI mode (see FIG. 13). Note that FIGS. 12(a) to 14(a) show the power (combustion) stroke and the exhaust stroke, and FIGS. 12(b) to 14(b) show the intake stroke and the compression stroke.

Further, in a cold-start time of the engine 1, the exhaust valves EX2 are closed until a warm-up operation is completed, and the operation is performed in the above-described SI mode. With this, in the cold-start time, the exhaust gas is exhausted only from the exhaust valves EX1 side to be cleaned up by the first catalyst 20a. Specifically, the exhaust gas flows only at the first catalyst 20a side, in which the first catalyst 20a is difficult to increase in temperature and thereby it is reactivated earlier, so that the clean-up performance of the exhaust gas at the cold-start time can be improved.

In the exhaust rebreathing HCCI mode (FIG. 12) in the low-load operation zone, the intake valves IN1, 2 are closed in the mid-course of the intake stroke and the second exhaust valves EX2 are opened from the first half of the intake stroke to the early stage of the compression stroke, so that the bulk of EGR gas is rebreathed into the cylinders and both the first and second exhaust valves EX1, EX2 are opened in the exhaust stroke.

More specifically, the intake valves IN1, 2 are opened in the vicinity of 30 degrees before the top dead center of the intake stroke, are closed earlier in the vicinity of 100 degrees after the top dead center thereof (in the vicinity of 80 degrees before the bottom dead center of the intake stroke), and the exhaust valve EX2 is opened from the vicinity of 20 degrees before the top dead center of the intake stroke to the vicinity of 20 degrees after the bottom dead center thereof (FIG. 12(b)). With this, the bulk of EGR gas flows back into the cylinders from the openings of the exhaust valves to be rebreathed into the cylinders, so that the temperature of the air-fuel mixture mass is increased. Here, the compression stroke, power stroke and exhaust stroke following the intake stroke are as usual, and the exhaust valves EX1, EX2 are opened from the vicinity of 50 degrees before the bottom dead center of the power stroke to the vicinity of 10 degrees after the top dead center of the exhaust stroke. Note that the exhaust valves EX2 are not always required to operate at the same timing as of the exhaust valves EX1, and the exhaust valves EX2 sometimes open earlier than the exhaust valves EX1 to flow much more blowdown exhaust gas to the exhaust valve EX2 side or closes earlier to reduce driving loss of the variable valve system.

In the blowdown supercharging mode in the middle-load operation zone (FIG. 13), the second exhaust valve EX2 is opened at least in the part of the power stroke, so that the pressure of the blowdown gas in the cylinder is accumulated in the second exhaust system (accumulator) 5; the second exhaust valve EX2 is closed and the first exhaust valve EX1 is opened in the exhaust stroke, so that the exhaust is performed; and the intake valves IN1, 2 are opened in the intake stroke and the second exhaust valve EX2 is opened from the end stage of the intake stroke to the first-half of the compression stroke, so that the pressure of the blowdown gas accumulated in the accumulator is introduced into the cylinder.

More specifically, the shatter valve 3 is closed, the second exhaust valve EX2 is opened from the vicinity of 75 degrees after the top dead center of the power stroke to the vicinity of 10 degrees before the bottom dead center thereof, so that the high-pressure blowdown gas is contained in the second exhaust system 5 of the EX2 side. In the exhaust stroke following the power stroke, the first exhaust valve EX1 is opened from the vicinity of 50 degrees before the exhaust bottom dead center to the vicinity of 10 degrees after the exhaust top dead center (see FIG. 13(a)) to thereby exhaust the combustion gas in the cylinder.

In the intake stroke following the exhaust stroke, the intake valve IN is opened from the vicinity of 10 degrees before the top dead center of the intake stroke to the vicinity of 20 degrees after the bottom dead center thereof to breathe the fresh air sufficiently and the second exhaust valve EX2 is opened from the vicinity of 20 degrees before the bottom dead center of the compression stroke to the vicinity of 95 degrees after the bottom dead center thereof (see FIG. 13(b)), so that the EGR gas is pushed into the cylinder by the exhaust gas pressure contained in the exhaust system 5 to realize the blowdown supercharging.

In the SI mode (FIG. 14) in the high-load operation zone, the intake valves IN1, 2 are opened from the vicinity of the top dead center of the intake stroke to the early stage of the compression stroke, and both the exhaust valves EX1 and EX2 are opened from the latter half of the power stroke to the vicinity of the top dead center of the exhaust stroke.

More specifically, the intake valves IN1, 2 open about 10 degrees before the top dead center of the intake stroke and close about 45 degrees after the bottom dead center. The compression stroke, power stroke and exhaust stroke following the intake stroke are as usual, and the exhaust valves EX1 and EX2 are opened from the vicinity of 50 degrees before the bottom dead center of the power stroke to the vicinity of 10 degrees after the top dead center of the exhaust stroke.

Thus, in the present mode, the second exhaust system 5 functioning as an accumulator is connected to the opening of the second exhaust valve EX2 out of the conventionally-provided two exhaust valves and the exhaust valve EX2 is structured to open in the power stroke, so that the pressure of the blowdown gas is accumulated in the second exhaust system 5. Further, the second exhaust valve EX2 is structured to open from the end stage of the intake stroke to the early stage of the compression stroke, preferably, just after the close of the intake valve, so that the pressure of the blowdown gas accumulated in the second exhaust system 5 is introduced into the above-described other cylinders. As a result, one out of the conventionally-provided two exhaust valves can be used as a valve to accumulate the pressure of the blowdown gas, so that the EGR amount can be increased easily and surely without complicating the structure.

Further, in the low-load operation zone, the intake valves IN1, 2 are closed earlier and the second exhaust valve EX2 is opened from the first half of the intake stroke to the early stage of the compression stroke, so that the bulk of EGR gas can be rebreathed into the cylinder, and as a result, one of the conventionally-provided two exhaust valves can be used as a valve to introduce the EGR gas, so that the EGR amount can be increased easily and surely without complicating the structure.

Further, in the warm up operation, the second exhaust valve EX2 is fixed in the closed state and the first exhaust valve EX1 is opened in the exhaust stroke, in which the exhaust gas is exhausted only in the second exhaust system 2 provided with the catalyst 20a, so that the activation of the catalyst 20a can be accelerated and the clean-up performance of the exhaust gas can be improved.

FIG. 15 to FIG. 18 are views to illustrate a blowdown pressure wave supercharge engine according to a fifth mode of the present invention, in which the same numerical references as of FIG. 11 to FIG. 14 denote the same portions or the equivalent portions.

Figure 15:
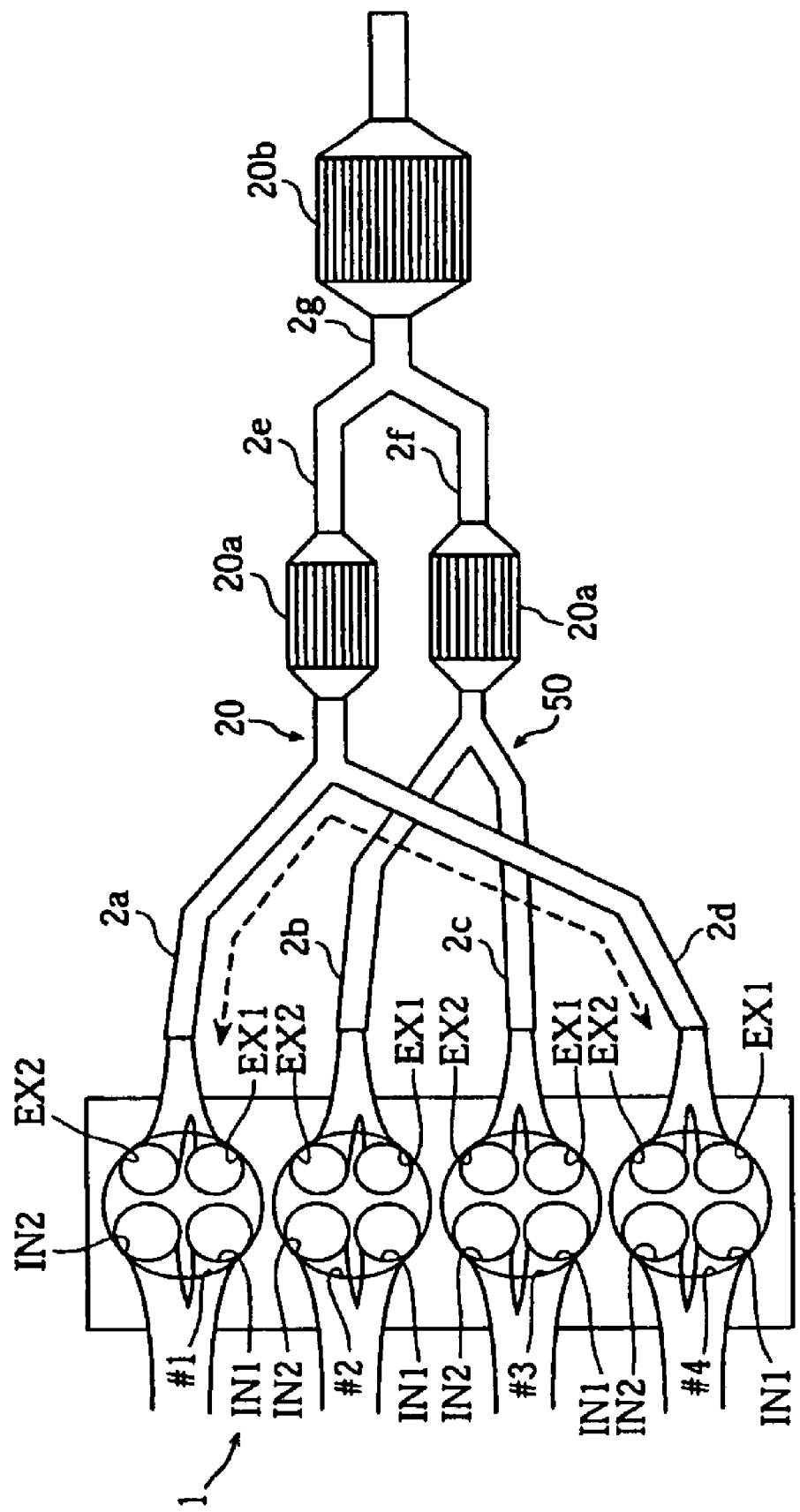
FIG. 15 is a schematic block diagram of an engine according to a fifth mode of the present invention.

FIG. 15 shows a four-cylinder blowdown pressure wave supercharge system. The engine 1 is a four-parallel-cylinder and four-valve HCCI engine provided with cylinders #1 to #4 each including the two intake valves IN1, IN2 and the two exhaust valves EX1, EX2. The ignition timing of the engine 1 is in the order of the cylinders #1, #3, #4, #2. An each interval between ignitions of the respective cylinders is 180 degrees in terms of the crank angle, and accordingly the ignition interval between the cylinders #1 and #4, and that between the cylinders #3 and #2 are 360 degrees.

All the two intake valves IN1, IN2 and the two exhaust valves EX1, EX2 are the variable valve system of the mechanical, hydraulic or electromagnetic type capable of changing the phase and valve travel freely. Note that it is acceptable that the phase and valve travel of the first exhaust valve EX1 out of the two exhaust valves is made invariable (fixed) and only the second exhaust valve EX2 is made to be the variable valve system of the hydraulic or electromagnetic type capable of controlling the phase and valve travel for each cycle. In that case, the introduction of the EGR gas is performed only by the second exhaust valve EX2.

The exhaust device of the engine 1 is a so-called 4-2-1 exhaust system and includes a first exhaust system 20 connecting the cylinders #1, #4 having the ignition interval of 360 degrees to exhaust and a second exhaust system 50 connecting the cylinders #3, #2 having the ignition interval of 360 degrees to exhaust, allowing exhaust interference to be prevented in the high-load SI mode and therefore suitable for improving output.

The first exhaust system 20 includes a first and fourth branch pipes 2a, 2d connected to the cylinders #1, #4, respectively, and a first merging pipe 2e merging both the branch pipes 2a, 2d. The second exhaust system 50 includes a second and third branch pipes 2b, 2c connected to the cylinders #2, #3, respectively, and a second merging pipe 2f merging both the branch pipes 2b, 2c. The second and first merging pipes 2f, 2e are merged by the main pipe 2g into a single pipe. Further, the first and second merging pipes 2e, 2f are provided with the first catalysts 20a, 20a, in an intervening manner, respectively, and the main pipe 2g is provided with the first catalyst 20b in an intervening manner.

The combined length of the first and fourth branch pipes 2a, 2d of the first exhaust system 20 and the second and third branch pipes 2b, 2c of the second exhaust system 50 are set so that the pressure wave by the blowdown gas of the cylinder on one side reaches to the exhaust port of the cylinder on the other side in the early stage or the first half of the compression stroke thereof. Incidentally, from a viewpoint of further assuring the reaching of the pressure wave by the blowdown gas, the first catalysts 20a, 20a acting as an ineffectual volume are preferably not provided. This is because, when the catalysts 20a are connected to the exhaust system, the volume of the catalysts possibly absorbs the pressure wave by the blowdown gas when the pressure wave reaches to connected portions to thereby reduce the pressure wave.

The engine 1 according to the present mode is operated in an "Exhaust Rebreathing+blowdown supercharging"/HCCI mode (see FIG. 16) in the low-load operation zone, while it is operated in a "full blowdown pressure wave supercharging"/HCCI mode (see FIG. 17) in the middle-load operation zone, and in a "blowdown supercharging suppressing the blowdown supercharging"/HCCI mode (see FIG. 18) in the middle to high-load operation zone. Note that it is operated in the SI mode being the same mode as of general engines in the high-load zone thereabove.

Here, in the blowdown pressure wave supercharging in the present mode, for example, the exhaust valves EX1, 2 are opened from the end stage of the power stroke to the exhaust stroke (see FIG. 16 to FIG. 17(a)) in the cylinder #1, while the exhaust valves EX1, 2 are opened only at a predetermined valve travel from the end stage of the intake stroke to the early stage of the compression stroke in the cylinder #4 (see FIG. 16 to FIG. 18(b)). With this, the pressure wave by the blowdown gas of the cylinder #1 reaches to the exhaust port of the cylinder #4 when the exhaust valve of the cylinder is opened, so that the pressure of the combustion chamber at the start of the compression stroke of the cylinder #4 becomes higher than the intake port pressure. In other words, the EGR gas is supercharged. Note that the same operation is performed as well with respect to the cylinders #2, #3. Hereinafter, the description will be given of the operation in the case where the EGR gas is supercharged into the cylinder #1 by the pressure wave by the blowdown gas of the cylinder #4, in detail, for each operation zone.

In the "full blowdown pressure wave supercharging"/HCCI mode (FIG. 17) in the middle-load operation zone, in the cylinder #1, the exhaust valves EX1, 2 are opened from the end stage of the power stroke to the exhaust stroke (see FIG. 17(a)), while in the cylinder #4, the intake valves IN1, IN2 are closed at the time slightly over the bottom dead center of the intake stroke and the exhaust valves EX1, 2 are opened from slightly before the bottom dead center of the intake stroke to the early stage of the compression stroke (see FIG. 17(b)). In this case, the exhaust valves EX1, 2 of the cylinder #4 are opened at the time when the pressure wave by the blowdown gas generated when the exhaust valves EX1, 2 of the cylinder #1 are opened reaches to the exhaust port of the cylinder #4. As a result, the bulk of EGR gas is pushed into the cylinder #4 from the exhaust port thereof, and thereby the pressure and temperature of the air-fuel mixture in the cylinder #4 are increased, so that the blowdown pressure wave supercharging is realized.

Figure 18:
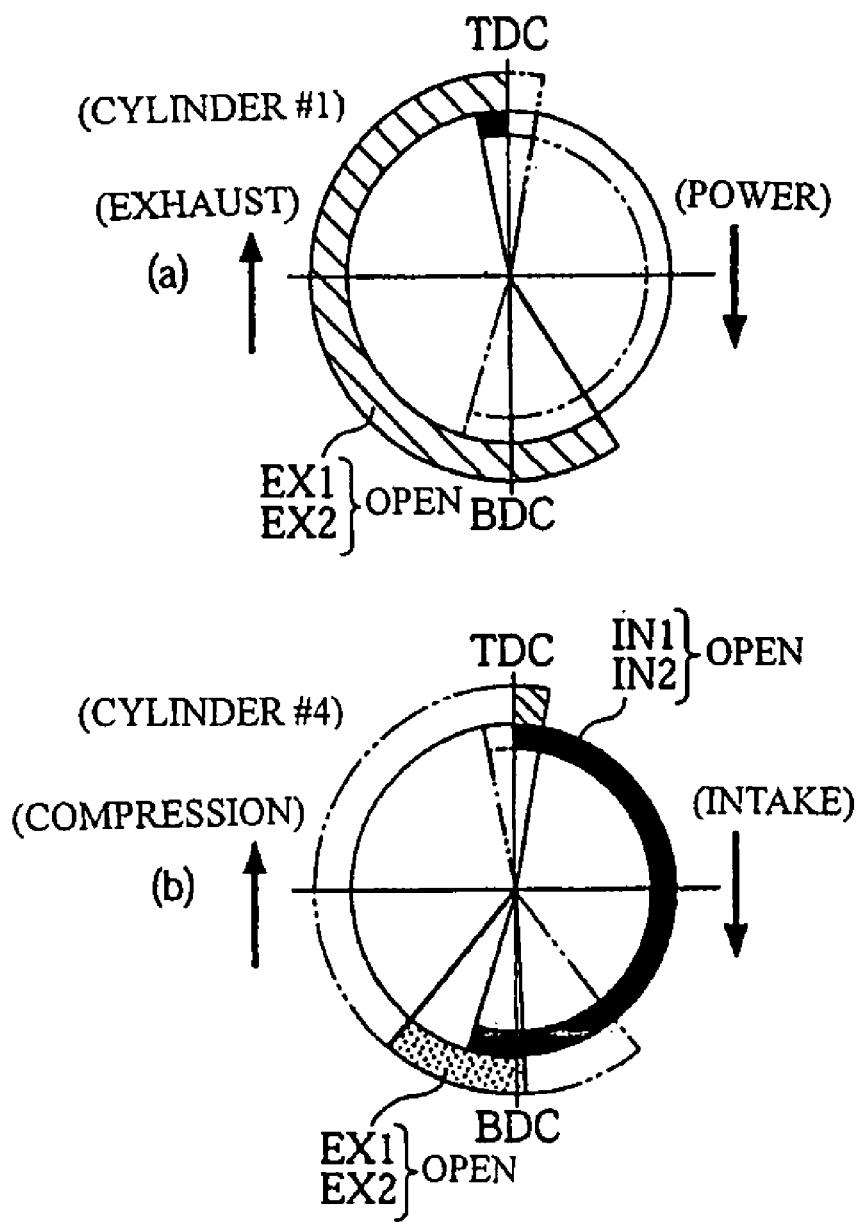
FIG. 18 is view showing valve timings in a "restraint blowdown pressure wave supercharging/HCCI mode in the middle-to-high load operation zone of the engine according to the fifth mode.

Meanwhile, in the "blowdown supercharging suppressing the blowdown supercharge effect"/HCCI mode (FIG. 18), in the cylinder #1, the exhaust valves EX1, 2 are opened from the end stage of the power stroke to the exhaust stroke (see FIG. 18(a)), while, in the cylinder #4, the intake valves IN1, IN2 are closed slightly after the bottom dead center of the intake stroke as in the middle-load operation zone. Also, the exhaust valves EX1, 2 are opened from the end stage of the intake stroke to the early stage of the compression stroke to have an angle range smaller than that in the middle-load operation zone (see FIG. 18(b)). As in the middle-load operation zone, almost, when the pressure wave generated when the exhaust valve of the cylinder #1 is opened reaches to the exhaust port of the cylinder #4, the exhaust valve of the cylinder #4 is opened. As a result, the bulk of EGR gas is pushed into the cylinder #4 from the exhaust port thereof, and thereby the pressure and temperature of the air-fuel mixture in the cylinder #4 are increased, so that the blowdown pressure wave supercharging is realized. Note that the supercharge effect is suppressed to the extent that the valve travel range of the exhaust valve in the cylinder #4 is smaller than the valve travel range in the middle-load operation.

Further, in the "exhaust rebreathing+blowdown supercharging"/HCCI mode (FIG. 16) in the low-load operation zone, in the cylinder #1, the exhaust valves EX1, 2 are opened from the end stage of the power stroke to the exhaust stroke (see FIG. 16(a)), while in the cylinder #4, the intake valves IN1, 2 are closed in the latter half of the intake stroke and the exhaust valves EX1, 2 are opened from the latter half of the intake stroke to the early stage of the compression stroke (see FIG. 16(b)). With this, the bulk of EGR gas flows back into the cylinder #1 and is rebreathed thereinto, so that the temperature of the air-fuel mixture is increased. Further, at the time when the pressure wave generated when the exhaust valve of the cylinder #1 is opened reaches to the exhaust port of the cylinder #4, the exhaust valve of the cylinder #4 is already opened. Therefore, the more bulk of EGR gas is pushed into the cylinder #4 from the exhaust port thereof, and thereby the pressure and temperature of the air-fuel mixture in the cylinder #4 are increased, so that the blowdown pressure wave supercharging is realized together.

As described above, in the present mode, as to the cylinders of which ignition timings have a phase difference of 360 degrees in terms of crank angle, the open timing ion the exhaust stroke of the exhaust valve of the cylinder on one side and the open timing in the intake and compression strokes of the exhaust valve of the cylinder on the other side are structured so that the pressure wave by the blowdown gas of the cylinder on one side reaches to the exhaust port of the cylinder on the other side when the exhaust valve is opened, so that the EGR gas amount can be increased by the pressure wave by the blowdown gas.

Further, in the middle and high load operation zones, it is structured that the intake valve is opened to the bottom dead center and the EGR gas is also introduced in the early stage of the compression stroke, and thereby the reduction in the intake amount of the fresh air can be prevented and the pressure in the combustion chamber in the early stage of the compression stroke can be made higher than the pressure in the intake port, so that the higher supercharge effect can be obtained.

The invention claimed is:

1. A homogeneous charge compression ignition engine comprising:
   a first cylinder and a second cylinder having mutually different ignition timings and in which an EGR gas is introduced into said second cylinder at least in an early stage of a compression stroke of said second cylinder, using a pressure in a combustion chamber at a part of a power stroke of said first cylinder, thereby making the pressure in the combustion chamber in the early stage of the compression stroke of said second cylinder higher than a pressure of an intake port, wherein an exhaust valve of said first cylinder is opened in a latter half of the power stroke to generate a pressure wave by a blowdown gas of said first cylinder, wherein an exhaust valve of said second cylinder starts to open before a bottom dead center of an intake stroke and is closed after an intake valve of said second cylinder is closed in the early stage of the compression stroke, and wherein an exhaust pipe length from said first cylinder to said second cylinder is set so as to cause the pressure wave by the blowdown gas of said first cylinder to reach an exhaust port of said second cylinder after the intake valve of said second cylinder is closed in the early stage of the compression stroke of said second cylinder.

2. The homogeneous charge compression ignition engine according to claim 1, wherein ignition timings of said first and second cylinders have a phase difference of 360 degrees in terms of a crank angle, wherein the exhaust valves of said first and second cylinders are opened in an exhaust stroke and they are structured to be opened at a predetermined angle even in the early stage of the compression stroke, wherein exhaust ports of said first and second cylinders are connected by an exhaust passage being set a pressure wave by the blowdown gas generated by an opening of the exhaust valve in an end stage of the power stroke of said cylinder on one side to reach to the exhaust port of said cylinder on the other side when the exhaust valve is opened in the compression stroke of said cylinder on the other side.

3. The homogeneous charge compression ignition engine according to claim 2, wherein the exhaust passage is provided for each group composed of two cylinders, the ignition timing of said two cylinders having the phase difference of 360 degrees in terms of the crank angle.

4. The homogeneous charge compression ignition engine according to claim 1, wherein, in a low-load operation zone, the intake valve of said second cylinder is closed in a mid-course of the intake stroke and earlier than the intake valve in a middle-to-high load operation zone, while the exhaust valve of said second cylinder is opened from a latter half of the intake stroke to an early stage of the compression stroke and earlier than the exhaust valve in the middle-to-high load operation zone, and thereby a bulk of the EGR gas is rebreathed in said second cylinder.

5. The homogeneous charge compression ignition engine according to claim 1, wherein the pressure wave by the blowdown gas of said first cylinder is generated before a bottom dead center of the power stroke of said first cylinder, and the pressure wave reaches the exhaust port of said second cylinder after a bottom dead center of the compression stroke of said second cylinder.

* * * * *